June 7, 1932. F. SCHAUM 1,861,821
SUSPENSION FOR AUTOMOBILES
Filed Nov. 29, 1929
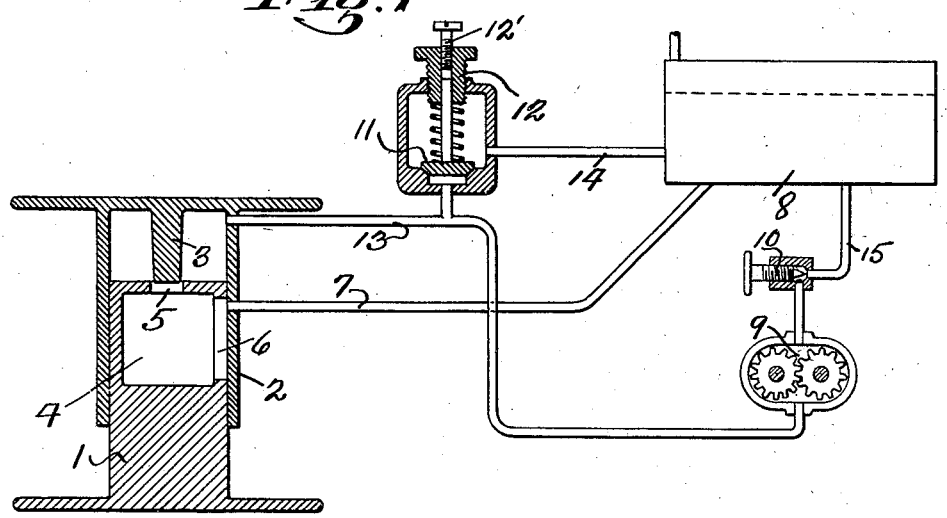
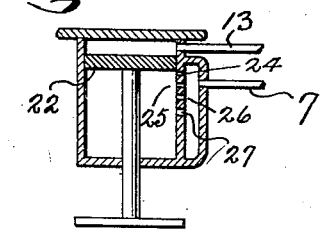
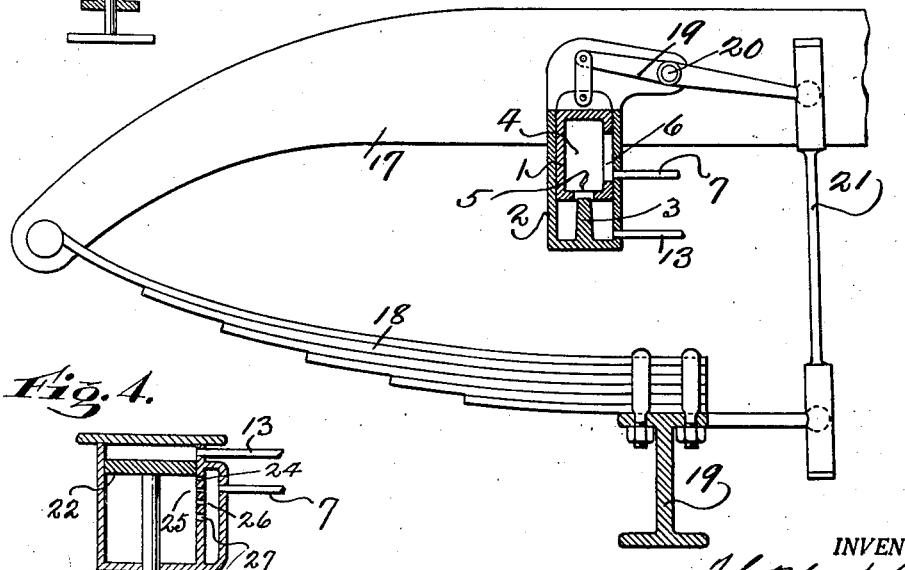
INVENTOR.
Fletcher Schaum
BY
Kiddle, Margesen and Horridge
ATTORNEYS.

Patented June 7, 1932

1,861,821

UNITED STATES PATENT OFFICE

FLETCHER SCHAUM, OF PHILADELPHIA, PENNSYLVANIA

SUSPENSION FOR AUTOMOBILES

Application filed November 29, 1929. Serial No. 410,417.

This invention relates to a suspension for automobiles, and has for one of its objects the provision of a construction whereby springs are entirely eliminated and a cushioning effect is produced by the use of hydraulic means.

In the conventional spring suspension for automobiles when the spring is compressed considerable energy is stored up, so that when the wheel of the automobile contacts with a bump or other obstruction, the spring is compressed, and after the obstruction has been passed the spring will release its stored energy and throw the car body upwardly beyond its normal position. To overcome this tendency various devices have been employed such as shock absorbers, for instance, which are used to control the energy of the springs and to dissipate the stored up energy so as to control the violence of the recoil of the spring. As mentioned above, the present invention provides a suspension whereby springs are eliminated and the use of shock absorbers in connection therewith eliminated also.

In the accompanying drawing:

Fig. 1 illustrates an embodiment of my invention; and

Figs. 2, 3 and 4 illustrate modifications.

Referring first of all to the construction illustrated in Fig. 1, 1 designates a piston which is to be attached to the axle of the automobile. Inasmuch as the mode of attachment of this piston to the axle constitutes no part of the invention the method of attachment has not been illustrated.

2 is a cylinder cooperating with the piston 1, this cylinder as will be understood being attached to the car frame in any suitable manner. The cylinder 2 is provided with a valve, plug or metering pin 3 which is cylindrical and tapered.

The piston 1 is provided with a cylindrical cavity 4 in the top of which is a port 5 adapted to receive the plug or metering pin 3. The side of the piston 1 is provided with a slot 6 opening into cavity 4 and adapted to register with an oil line 7 leading from an open oil tank 8. 9 designates an oil or liquid gear pump connected to and driven by the engine of the autmomobile on which my device is mounted. 10 designates an adjustable needle valve in the intake side of pump 9, provided for the purpose of regulating the volume of oil delivered to the pump. 11 is a relief valve, 12 an adjustable member for regulating the pressure at which the relief valve will open and 12' a stop adapted to be regulated so as to control the amount of valve opening. One side of the relief valve is connected to the pressure line 13 of the pump 9, the relief side of the valve being connected by pipe 14 to the oil tank or reservoir 8.

When an automobile equipped with this device is at rest the piston 1 is telescoped by the cylinder 2 and the frame of the car will rest upon suitable rubber buttons or buffers.

When the engine of the automobile is started the pump 9 which as above mentioned is driven thereby is immediately started and oil is drawn from the reservoir 8 by way of pipe 15 to the pump, and is delivered from the pressure side thereof by way of pipe 13 to the pressure chamber of cylinder 2 above the piston 1. This will effect a raising of the frame and body of the car, in other words, will effect an upward movement of the cylinder 2 until the metering pin or plug 3 recedes sufficiently from the orifice 5 in the piston 1 to allow the oil being delivered by the pump 9 to enter the piston cavity or chamber 4 and to pass through the slot 6 and by way of pipe 7 back to the reservoir or tank 8 to be recirculated.

The relief valve 11 is so set as not to lift or unseat under these conditions. Should the car remain at rest it will be appreciated that the cylinder 2 and hence the frame and body of the car will be raised a certain distance until the oil delivered by the pump 9 has unrestricted circulation.

Assuming the car is now in motion and that a wheel of the car passes over some obstruction in the road, this will force or raise the piston 1 upwardly to cause the metering pin or plug 3 to restrict the orifice 5 and to increase the pressure in the pressure chamber of the cylinder sufficiently to unseat the relief valve 11 to dissipate the energy built up in this chamber, and permit the oil to be circulated from reservoir 8, pipe 15, pump 9, pipe 13, relief valve 11, pipe 14 and back to the reservoir.

After the obstruction has been passed, the relief valve will close, the oil will again flow in its original path, that is, from the discharge side of the pump, pipe 13, the pressure chamber of the cylinder above the piston 1, orifice 5, slot 6 and return pipe 7, to tank 8.

It will be seen, therefore, that there is no tendency as in the case of spring suspension for the frame and car body to be thrown above normal position, the lifting force developed due to the wheels passing over an obstruction being dissipated by lifting of the relief valve, and after the obstruction has been passed all parts return to their original position and the frame is held in equilibrium.

It is to be noted that the metering pin 3 may be shaped to suit various conditions. If it is a gradual taper the car will be raised rapidly at first and then with a gradual diminishing force until equilibrium is attained. If the pin is cylindrical, as distinguished from tapered, then the car will be raised with a uniform force until equilibrium is attained. If the pin is cylindrical and tapered then the car frame will be raised uniformly at first, then with a gradual diminishing speed. It will be seen, therefore, that any desired action in this respect can thus be obtained.

It is to be understood that I have not attempted in the drawing of this application to show or illustrate a complete layout for installation.

It is to be understood, also, that the apparatus in Fig. 1 may be connected to each wheel, each installation having its own pump and its own piston and cylinder so that the functioning or action of one wheel will not interfere with or be connected in any way with the pressure side of any of the other pistons or cylinders. It may be necessary also to employ a separate relief valve for each installation.

The pump 9 has been referred to as being attached to the engine to be driven thereby and also it has been mentioned that the oil pump could be attached to the drive shaft of the automobile. In this event, of course, the pump would not function until the car was in motion. It is to be understood, furthermore, that if desired the pump can be driven by a separate motor entirely such as an electric motor.

In some cases it may be desirable to attach my improved apparatus to an automobile of conventional design. In such a case the springs of the automobile could be retained, but merely for attaching the axles to the frame, the springs it being understood being so adjusted that they would not lift the frame from the axles.

In the embodiment of my invention illustrated in Fig. 2 I have shown my invention applied to an existing automobile of conventional design. In this form or embodiment of the invention the frame of the automobile has been designated 17 and it will be seen that the springs 18 have been retained merely as a means for attaching the frame to the axle which is shown at 19. As a matter of fact the rear part of the spring construction has been cut off entirely. In this type of installation the cylinder 2 as before is attached to the frame 17 in any suitable manner but in an inverted position with respect to the showing in Fig. 1. The piston 1 has been provided with an operating lever 19' pivoted at 20, its outer end being attached to a vertically extending structure shown at 21 which at its lower end is shown attached to the axle 19. The operation of this type of installation is similar to that in Fig. 1 in that any movement upwardly of the axle 19 will of course rock the lever 19' about its pivot so that the piston 1 will be pushed inwardly of its cylinder 2.

In Fig. 3 I have shown a still further modification of my invention in which instead of the piston 1 I employ a conventional piston 22 provided with a port 23 which is controlled by the metering pin 3. The port 23 is off center. Oil or other liquid is admitted above the cylinder through the pipe 13, as in the form of my invention shown in Fig. 1, and passed out of the cylinder below the piston through pipe 7.

It is to be understood that in this form of my invention pump 9, volume regulating device 10 and relief valve 11 will be employed in the same manner as in the embodiment of my invention illustrated in Fig. 1.

In Fig. 4 I have also shown a conventional piston 22 but in this case the wall of the piston cylinder is provided with ports shown at 24, 25, 26 and 27. These ports increase in area, the lowermost port 27 being the largest. Oil or other liquid is admitted to the piston cylinder by pipe 13 and as the piston moves downwardly the ports 24, 25, 26 and 27 will be uncovered, thus relieving the pressure on the piston as more ports are uncovered, until finally equilibrium is attained. The liquid passing through these ports in the wall of the piston cylinder returns to the reservoir by pipe 7.

What I claim is:—

1. In a suspension for automobiles a piston, a cylinder, a fluid reservoir or tank, said piston being provided with a chamber communicating with said reservoir, said piston being provided with a port for placing the pressure chamber of the cylinder in communication with the said piston chamber, a connection between the pressure chamber and said reservoir, and a valve carried by said cylinder and controlling said port to regulate the circulation of fluid from the reservoir through the cylinder and piston and back to the reservoir in a closed circuit.

2. In a suspension for automobiles a piston, a cylinder, said piston being provided with a ported chamber communicating with the pressure chamber of the cylinder, a fluid reservoir or tank connected to said piston chamber and said pressure chamber, and a tapered metering valve carried by the cylinder and adapted upon relative movement between the piston and cylinder to control the passageway between the piston chamber and the pressure chamber.

3. In a suspension for automobiles the combination of a piston, a cylinder therefor, one of said members being connected to the axle of the automobile, the other to the frame of the antomobile, a fluid reservoir, said piston being provided with a chamber communicating with said reservoir and with the pressure chamber of the cylinder, a pump for circulating fluid from said reservoir through said pressure chamber and piston chamber and back to the reservoir in a closed circuit, a valve carried by said cylinder for controlling the flow of fluid from the pressure chamber to the piston chamber, and a relief valve in the delivery side of said chamber and having its piston side connected to said reservoir.

4. In a suspension for automobiles the combination of a piston, a cylinder therefor, one of said members being connected to the axle of the automobile, the other to the frame, a fluid reservoir or tank, said piston being provided with a chamber communicating with the pressure chamber of the cylinder and with said tank, a pump driven by the engine for circulating fluid from said tank through said pressure chamber, piston chamber and back to the tank in a closed circuit, a valve carried by the cylinder and adapted to control the amount of fluid delivered by said chamber and passed from the pressure chamber to the piston chamber, and a relief valve in the pressure side of said chamber, the relief side of this valve being connected to said reservoir.

5. In a suspension for automobiles the combination of a cylinder and a piston therefor carried by the frame of the automobile, said piston being provided with a chamber communicating with the pressure chamber of the cylinder, an external relief valve connected to the interior of said cylinder, a metering valve carried by said cylinder and adapted to control the flow of fluid from the pressure chamber to the piston chamber, and a connection between the axle of the automobile and said piston whereby the relative position of the piston and valve is altered.

6. In a suspension for automobiles a piston, a cylinder therefor, a fluid reservoir, a pump intermediate said reservoir and said cylinder, means for maintaining communication between the discharge side of said pump and said cylinder above said piston, a pipe leading from the interior of said piston to said reservoir, said piston being provided with a valve-controlled port whereby fluid may pass from the pressure side of said piston to said pipe, and a valve in the intake side of said pump intermediate the fluid reservoir and pump for regulating the volume of liquid drawn from said reservoir.

7. In a suspension for automobiles, a piston, a cylinder for said piston, a fluid reservoir, a pump for circulating liquid from said reservoir to said cylinder on the pressure side of said piston and through the piston back to said reservoir, a relief valve for preventing the building up of excess pressure on the pressure side of said piston, adjustable means for regulating the extent of opening of said relief valve, and adjustable means for regulating the pressure under which said relief valve will open.

8. In a suspension for automobiles the combination of a cylinder, a piston therein, said piston being provided with a port, means for circulating a liquid in a closed circuit from a reservoir to the said cylinder at the pressure side of said piston, through the piston and from the opposite side of the piston back to the reservoir, and a valve carried by said cylinder for controlling said piston port.

This specification signed this 26th day of November, 1929.

FLETCHER SCHAUM.